Apr. 24, 1923.

W. H. LEISTER 1,453,248

GREEN CORN DEBUTTING MACHINE

Filed Sept. 20, 1917

W. H. LEISTER 1,453,248

GREEN CORN DEBUTTING MACHINE

Filed Sept. 20, 1917

W. H. LEISTER 1,453,248

GREEN CORN DEBUTTING MACHINE

Filed Sept. 20, 1917

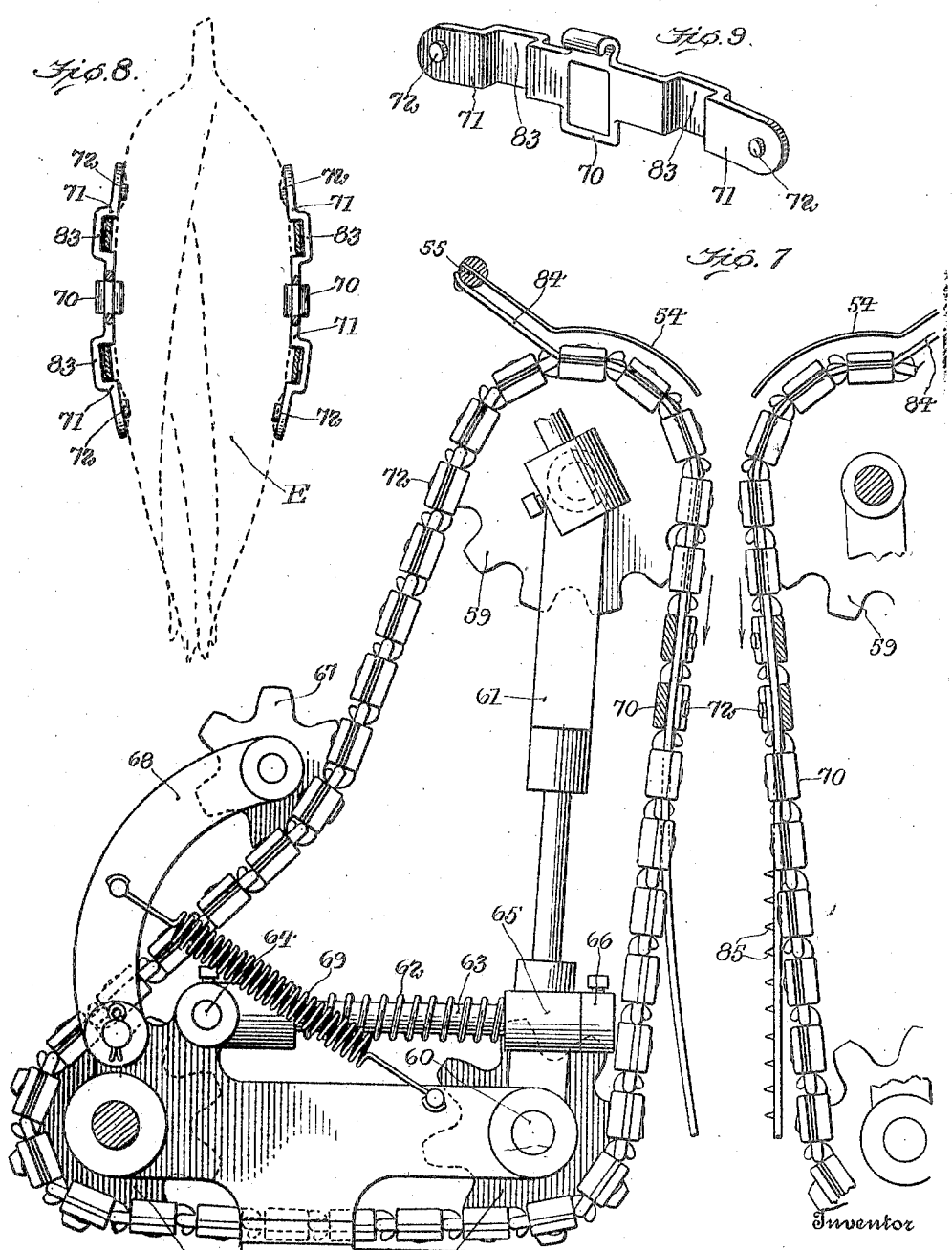

Apr. 24, 1923.
W. H. LEISTER
1,453,248
GREEN CORN DEBUTTING MACHINE
Filed Sept. 20, 1917
9 Sheets-Sheet 7
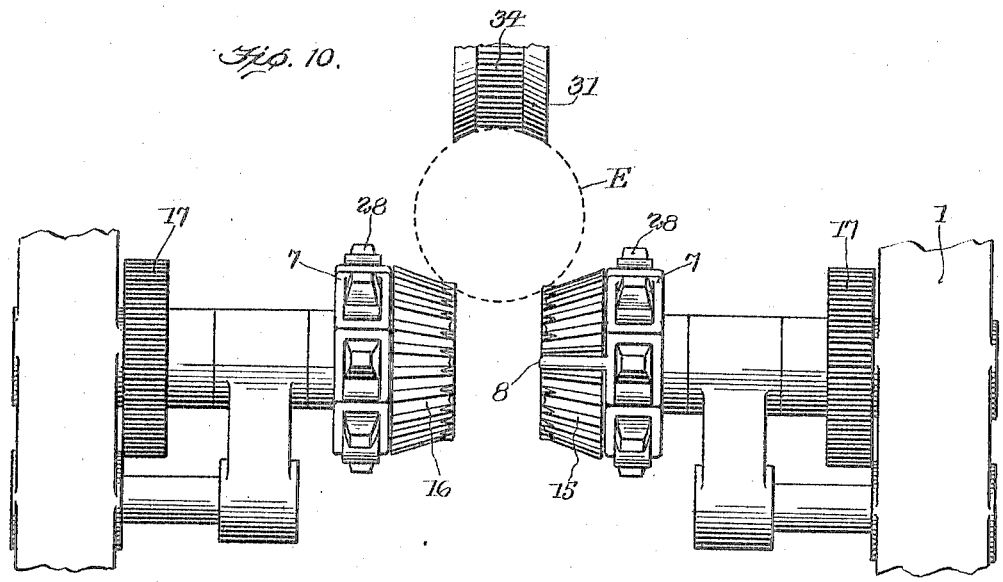
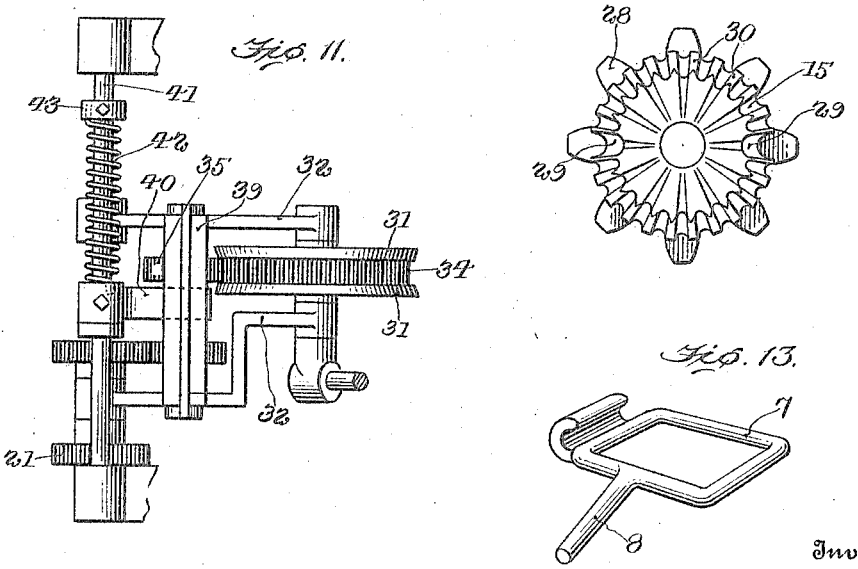

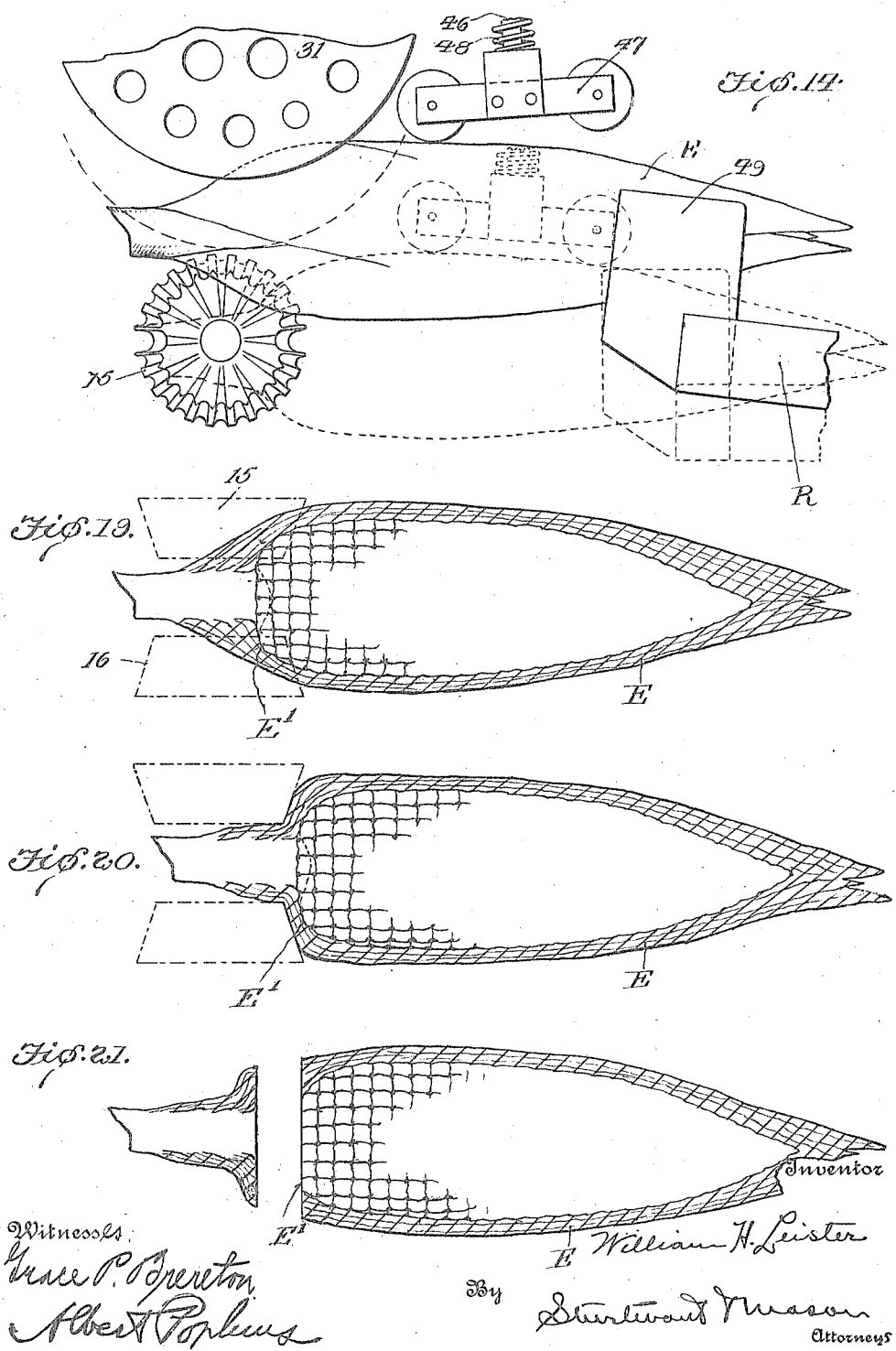

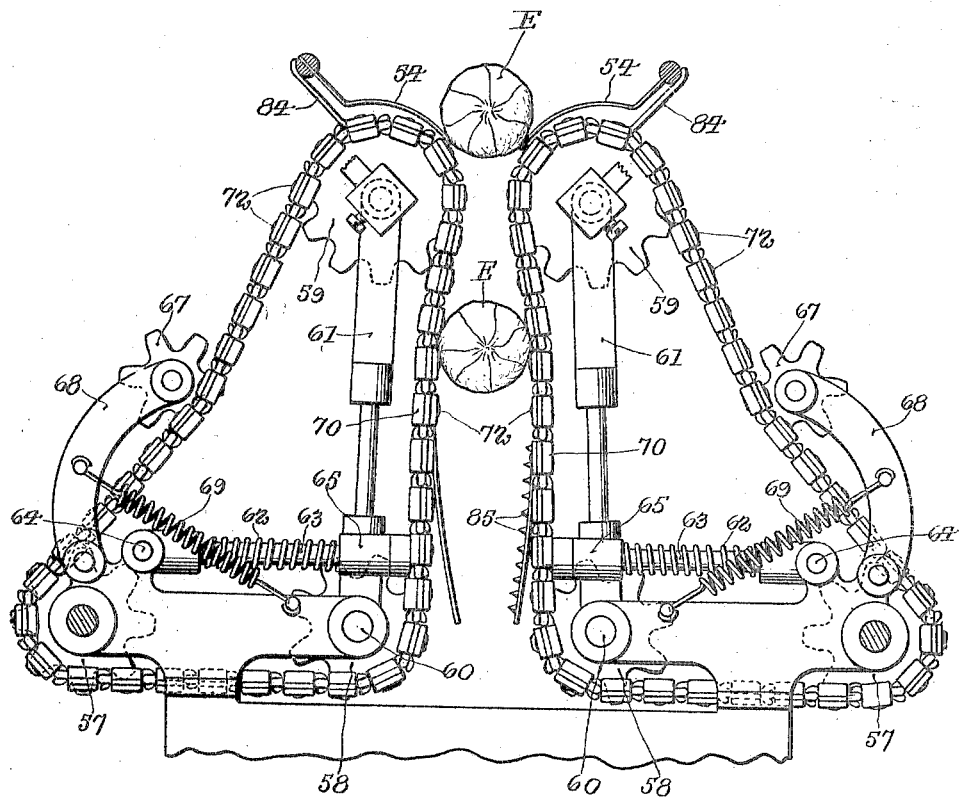

Patented Apr. 24, 1923.

1,453,248

UNITED STATES PATENT OFFICE.

WILLIAM HAMMOND LEISTER, OF WESTMINSTER, MARYLAND, ASSIGNOR TO THE UNITED MACHINERY COMPANY, OF WESTMINSTER, MARYLAND, A CORPORATION OF MARYLAND.

GREEN-CORN-DEBUTTING MACHINE.

Application filed September 20, 1917. Serial No. 192,367.

*To all whom it may concern:*

Be it known that I, WILLIAM HAMMOND LEISTER, a citizen of the United States, residing at Westminster, in the county of Carroll, State of Maryland, have invented certain new and useful Improvements in Green-Corn-Debutting Machines, of which the following is a description, reference being had to the accompanying drawing and to the figures of reference marked thereon.

The invention relates to new and useful improvements in machines for debutting corn, and more particularly to a machine for debutting or removing the portion of the stalk or stem remaining on the thick or butt end of ears of green corn after the same have been pulled or picked from the stalks.

In order to accomplish successful husking on machines as at present used, it has been necessary not only to remove the butt end of the ear to prevent clog in the husking machanism, but also to sever or cut the tough clinging interlocking husks at the butt end of the ears, and to tear them loose from the ears and each other, so as to facilitate the removal of the husks. The husks are attached to the cob portion of the ear as well as to the butt or stalk. The ears sometimes are indented where the husks are attached thereto and the grains or kernels project beyond this point where the inner husks are attached. The properly debutted ear is cut or severed at the grain shoulder, often shaving or leaving the first kernels exposed or grinning but uninjured. This entirely severs the husks which must pass over the grain shoulder and at the same time causes no waste of the corn.

The husks often completely hide the location of the grain shoulders and the ears vary greatly in size and shape, making the proper positioning of the ear relative to the cutting or severing means very difficult. Various devices have been employed for gauging the ear by approaching the grain shoulder by a relative movement along the stalk or stem, but these gauging devices have accomplished at the most an inaccurate positioning of the ear, resulting in a failure to release the husks or in a waste of the corn.

An object of the present invention is to provide an alining means for a debutting machine wherein the ear of corn is positioned relative to the severing means by an alining device which is caused to find and position the ear by the grain shoulder of the ear proper as distinguished from the shoulder formed by the husks which has no fixed or definite relation to the grain shoulder of the ear.

Another object of the invention is to provide an alining means of the above character wherein the alining device is caused to engage the body of the ear proper rather than the stem in finding the grain shoulder to position the ear.

Another object of the invention is to provide an alining device of the above character wherein the ear of corn, before being presented to the severing means, is caused to travel endwise, tip first, over or along the alining devices so that said alining devices may be caused to crush the husks and stem, if necessary, and thus find the grain shoulder of the ear and aline the ear by said grain shoulder relative to the severing means.

A further object of the invention is to provide a debutting machine for corn of the above character wherein the means for conveying the ears to the alining and severing mechanism is free from pockets and is capable of receiving the ears, one after the other, placed promiscuously thereon as to the spacing of the ears, and feeding the same endwise one at a time over or along the alining devices in spaced relation, so as to permit the proper operation of the alining devices and the presenting of the ears to the severing mechanism.

A still further object of the invention is to provide an alining and severing means of the above character, wherein the ear of corn passes over or along the alining means, with a retarding or resisting device for engaging the tip end of the ear, regardless of the size of the ear, for preventing the grain shoulder passing the alining devices, so as to insure the grain shoulder of the ear passing the severing mechanism in the desired relation thereto.

A still further object of the invention is to provide a retarding or resisting device of the above character which engages the ear at the tip end, holding back the husks and causing the ear to creep in the husk, which aids in loosening the husks from the ear.

A still further object of the invention is to provide means co-operating with the alining and severing means above referred to, which receive the ear and presents the same to the severing means by a movement of the ear in a direction at right angles to its movement as the ear passes over the alining devices, whereby the ear may be moved quickly away from its initial alined position to permit another ear to be alined.

Another object of the invention is to provide supporting plates which support the body of the ear during the alining operation, and which permit the body of the ear to pass between the same after being alined.

A further object of the invention is to provide means for starting the ear on its right angle course by engagement with the body of the ear during and after the same has been alined or positioned relative to the severing mechanism.

A still further object of the invention is to provide feeding means for conveying the ears from alined position to severing position, which is so constructed as to yield bodily and also yield in section, so as to permit two or more ears to be simultaneously fed between the same and conveyed thereby, regardless of the size of the ears.

A still further object of the invention is to provide a debutting machine of the above character wherein the severing mechanism consists of two rotating knives, one of which is caused to travel at a greater speed than the other.

A still further object of the invention is to provide means for engaging the husks on the ear after said ear has been debutted, for loosening and separating the husks preparatory to the ear being presented to a husking machine.

These and other objects will in part be obvious, and will in part be hereinafter more fully disclosed.

In the drawings, which show by way of illustration one embodiment of the invention,—

Figure 7 is an enlarged view, partly in section and partly in front elevation, showing one of the feeding devices and a portion of the other feeding device, and also showing the husk loosening and separating members;

Figure 8 is a sectional view in plan through the feed band jaws showing the manner in which the jaws grip the ear which is indicated in dotted lines;

Figure 9 is a perspective view of one of the links of the feed band jaws;

Figure 10 is a detail in front elevation, showing the alining devices and a portion of the pressure disk which forces the ear against the alining devices;

Figure 11 is a detail view in plan, showing the pressure disk and the means for supporting and rotating the same;

Figure 12 is a side view of one of the alining devices;

Figure 13 is a perspective view of one of the links of the conveyor for presenting the ears to the alining devices;

Figure 14 is a view showing more or less diagrammatically in side elevation, the pressure disk, the pressure means, one of the aliners, the retarding device, and in full lines an ear of corn with the grain shoulder at substantially the high point of the alining devices, and in dotted lines the grain shoulder as finally positioned relative to the alining devices;

Figure 15 is an end view, showing the jaw bands and in full lines showing an ear of corn gripped thereby and another ear of corn about to be gripped by the jaw bands;

Figure 16 is a view of the supporting frame for one of the jaw bands;

Figure 17 is a sectional view of the upper end of the supporting post for the retarding means, and showing the limiting stops therefor;

Figure 18 is a sectional view on the line 18—18 of Figure 1;

Figure 19 is a sectional view through an ear of corn, showing in dotted lines the alining devices, the ear being positioned with the grain shoulder substantially at the high point of the alining devices;

Figure 20 is a similar view, but showing the husks crushed and the ear finally positioned for the cutting means; and Figure 21 is a sectional view showing an ear of corn with the stalk or stem severed therefrom at the proper point relative to the grain shoulder.

Figure 1:
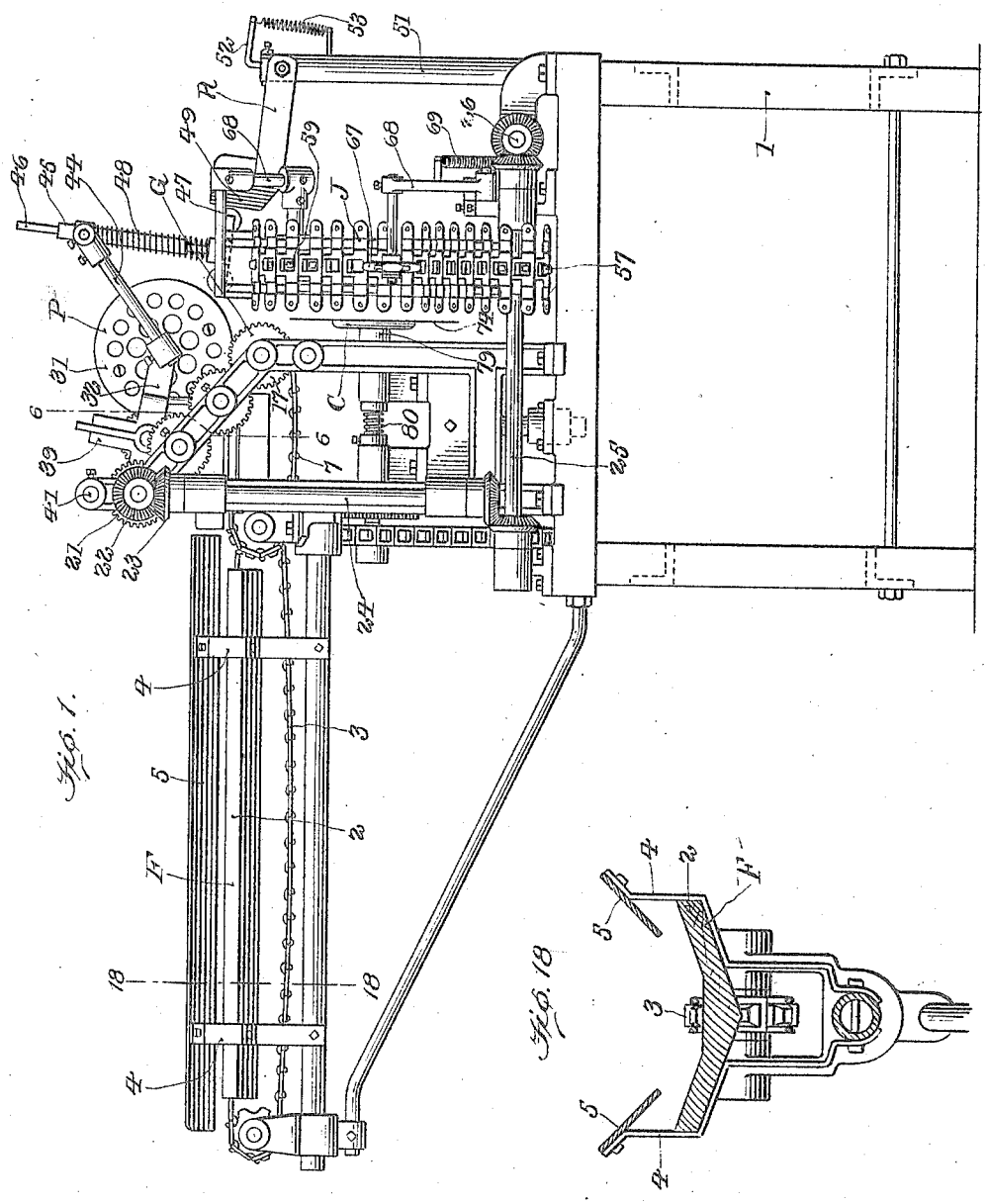
Figure 1 is a side view of a corn debutting machine embodying my improvements.

The present invention is directed to a debutting machine which is more particularly adapted for severing the stem or stalk from the ear preparatory to husking said ear, although from certain aspects of the invention it is obvious that the debutting machine may be used for severing the stalk or stem from the ear after the husks have been removed. As above noted, it is desirable to sever the stalk or stem from the ear as closely as possible to the grain shoulder of the ear proper, as this frees the husks without any waste of the corn. In other words, if the stalk or stem be severed from the ear some distance out from the grain shoulder of the ear, not only does the ear have the objectionable projecting stub, but some of the husks remain attached to this projecting stub of the stem or stalk, and it is more or less difficult to remove the husks from the ear. On the other hand, if the severing device cuts the ear at a point inside of the grain shoulder, a certain amount of the grain is wasted.

The difficulty in properly alining the ear so as to sever the same at the proper point comes from the fact that the grain shoulder is often buried in the husks, and the husks are often formed with a shoulder some distance removed from the grain shoulder proper of the ear, or sometimes with apparently no shoulder at all. When the shoulder on the husks or the shaping of the husks themselves are depended upon to aline the ear, then it is cut with great uncertainty relative to this grain shoulder of the ear proper.

One of the purposes of the present invention is, therefore, to provide means which will find the grain shoulder of the ear proper and utilize the grain shoulder to position the ear, so that each ear will be severed at a predetermined point relative to its grain shoulder. This is accomplished broadly by causing the ear to travel endwise and tip first over or along the alining means, and the ear is pressed against the alining means. This alining means is so constructed that when the grain shoulder of the ear is reached the husks which are more or less yielding or soft, may be crushed, and likewise the stem or stalk if necessary, so that the alining means may thus find the grain shoulder for positioning the ear. Preferably I use two spaced rotating alining devices, over which the ear is moved, and the ear is held against these alining devices by a positively rotated pressure disk or disks. Co-operating with these alining devices is a retarding device which engages the tip end of the ear, and this retarding device is so constructed as to yield and thus engage the ear and retard the same, regardless of its length or thickness, with a sufficient pressure to cause the grain shoulder to be held back against the alining devices. The retarding device also holds back the husks and causes the ear to creep in the husks. The pressure disks aid in driving the ear into the retarding device.

I have also provided feeding means consisting of co-operating jaw bands which are adapted to engage and firmly grasp the ear after it is properly positioned and feed the same to the severing mechanism, which preferably consists of rotating knives, one of which travels at a greater speed than the other. These jaw bands are mounted so that they may yield bodily to grip an ear of any size, and to permit it to pass between the same, and they are constructed also so as to yield sectionally in order that two or more ears may be conveyed at the same time. The supporting members of the jaw band also are so constructed as to adapt themselves to the irregular shape of the ears so that the ear will be firmly gripped and held with its longitudinal center in a line at right angles to the plane of the severing means, to insure the severing of the butt of the ear in a proper plane relative to the longitudinal axis of the ear. The jaw bands are positioned so as to move the ear in a direction at right angles to the direction of movement of the ear as it passes over the alining devices, and yielding temporary supports are provided for the ear which permits the ear to be positioned relative to the alining devices before the movement of the same in a direction transversely of its length occurs. Cooperating with these jaw bands are devices which engage the husks on the ears as they are leaving the jaw bands for the purpose of loosening the husks preparatory to the husking of the corn.

Referring more in detail to the drawings: My improved debutting machine includes a supporting frame, indicated at 1 in the drawings, which frame may be of any suitable construction. Mounted on this supporting frame is a feeding-in mechanism, indicated at F in the drawings, on which the ears of corn are placed one after the other. The feeding means delivers the ears one after the other to an alining device consisting of two spaced members, which are indicated at G in the drawings. The ears are held against the alining devices by a pressure mechanism, indicated at P, and they are retarded in their forward movement over the alining devices by a retarding member, indicated at R. While the ears are being placed relative to the alining devices, they are temporarily supported by yielding supporting plates, indicated at S in the drawings. The ears are started on their right angle downward movement to the severing means by a controller indicated at E, and the plates yield so that the ears are gripped by jaw bands, indicated at J in the drawings, and these jaw bands present the ears to the severing means indicated at C in the drawings.

With this general statement of the essential features of the machine, the details of said devices will be described.

*Feeding-in mechanism.*

The ears of corn are delivered to the machine by the feeding-in mechanism, which includes a supporting table 2 suitably mounted on the framework of the machine and over which moves a traveling endless carrier 3, which may be in the form of a belt or a link chain or the like. Carried by the table 2 are brackets 4—4, carrying the side members 5, 5 which form a trough along which the ears are caused to move in an endwise direction. The operator places the ears one after the other in the trough, with their tips pointing in a forward direction but they may be laid in the trough, so far as spacing is concerned, promiscuously, that is, with one slightly overlapping the next, and thus the operator may very quickly place the ears on the feeding-in mechanism and feed the machine with great rapidity.

The conveyor belt 3 delivers the ears, one after the other, to a second endless conveying mechanism, which consists, as herein shown, of two spaced traveling link chain 7—7 which are provided with projecting fingers 8—8. The fingers on one chain are staggered relative to the fingers on the other, to permit crooked butts to find and pass between same, and these fingers project toward each other and incline slightly from horizontal, thus forming the supporting means for the ear for carrying the same forward.

After leaving the supporting table 2, the ears are fed over yielding sections 9—9 which may be of any desired construction. These yielding sections, as herein shown, are in the form of brushes. The conveyor 3 runs over the sprocket wheels at each end of the feed table 2. The sprocket wheel 10 at the inner end of the feed table for said conveyor is mounted on a shaft 11 which is driven by a sprocket chain 12. The endless chains 7—7 pass over sprocket wheels 13—13, respectively, on this shaft 11. Guiding devices 14—14 direct the ear of corn in its forward movement and holds the same centrally positioned over the yielding sections 9—9 as the ear passes into the alining mechanism G. The endless chains 7—7 are caused to move at a greater speed than the endless conveyor 3, and therefore, if two ears are slightly overlapped, as they are moved along by the conveyor 3, the forward ear, as soon as it is picked up by the fingers 8—8 of the chains 7—7 will be caused to move away from the ear which overlaps the same, thus separating and spacing the ears as they are delivered to the alining mechanism.

From the above it will be apparent that I have provided a feeding-in mechanism wherein the ears may be fed thereto promiscuously as to spacing, and this greatly increases the capacity of the machine over that of the present well-known types wherein each ear is placed in an individual moving pocket and fed thereby to the machine.

*Alining mechanism.*

The alining mechanism consists of two co-acting, independent members each in the form of a frustum, of a cone, revolving at the same speed and in the same direction and about the same longitudinal axis. The frustums face each other and serve as a trackage for the forward conveying of the ear. The principal function of these members is to aline the ears for the cutting mechanism and this is accomplished by crushing the husks to find the grain shoulder and the positioning of the ear by the grain shoulder. The alining devices are indicated in the drawings at 15 and 16. These alining devices are spaced a distance slightly less than the diameter of the grain shoulder of the smallest ear, as clearly shown in Figure 19. The alining device 15 is carried by a suitable shaft mounted in a fixed bearing in the frame, and this shaft is rotated by a gear wheel 17. The alining device 16 is also carried by a shaft mounted in a fixed bearing in the frame, which shaft is rotated by a gear wheel 18. The gear wheel 17, through a train of gears, is driven by a gear wheel 19 on a shaft 20, while the gear wheel 18 through a train of gears is driven from a gear wheel 21 also on the shaft 20. This shaft 20 is journaled in suitable bearings in the frame and is driven by a beveled gear 22 which meshes with a beveled gear 23 on a vertical shaft 24. The vertical shaft 24 carries a beveled gear at its lower end meshing with a beveled gear on a horizontal shaft 25. The horizontal shaft 25 at its opposite end carries a beveled gear meshing with a beveled gear on the main driving shaft 26 which is operated by the usual belt wheel or the like, indicated at 27. Through this gearing mechanism which of course, may be variously modified, the alining devices 15 and 16 are positively rotated.

The alining device 15 is provided with sprocket teeth 28 which engage the chain 7 at that side of the machine, while the alining device 16 also has sprocket teeth 28 engaging the chain 7 at the other side of the machine. In Figure 13 of the drawings, I have shown one link of the chain 7 and the projecting finger carried by this link, and it will be noted that this finger projects downwardly slightly. This downward projection of the fingers tends to center the ears between the chains and properly deliver the same to the alining devices. The alining devices 15 and 16 are formed with recesses or pockets 29, which are adapted to receive these fingers 8. These alining devices are also provided with ribs 30.

The alining devices are constructed, as clearly shown in the drawings, so that the ear of corn in the present embodiment of the invention passes endwise and tip first over these alining devices. The shoulders or angles of the alining devices formed by the inclined faces and the adjacent parallel faces serve to crush the husks and the stem if necessary so as to find the grain shoulder and the part of the ear immediately in rear of the grain shoulder passes between the alining devices. The yielding sections 9, 9 of the feeding-in table permit the stalk or stem of extreme length to pass between the alining devices 15 and 16, and the fingers 8, 8 are spaced in their travel to permit the stalk or stem to pass between the same. This crushing action of the alining devices also ruffles and loosens the husks.

As above noted, the alining devices are provided with recesses or pockets which receive the fingers 8, 8 on the feed chains. This enables the feed chains to carry the ear into engagement with the alining devices and then the feed chains in a sense disappear, although they continue to aid in the carrying forward of the ear.

Pressure mechanism.

Figure 3:
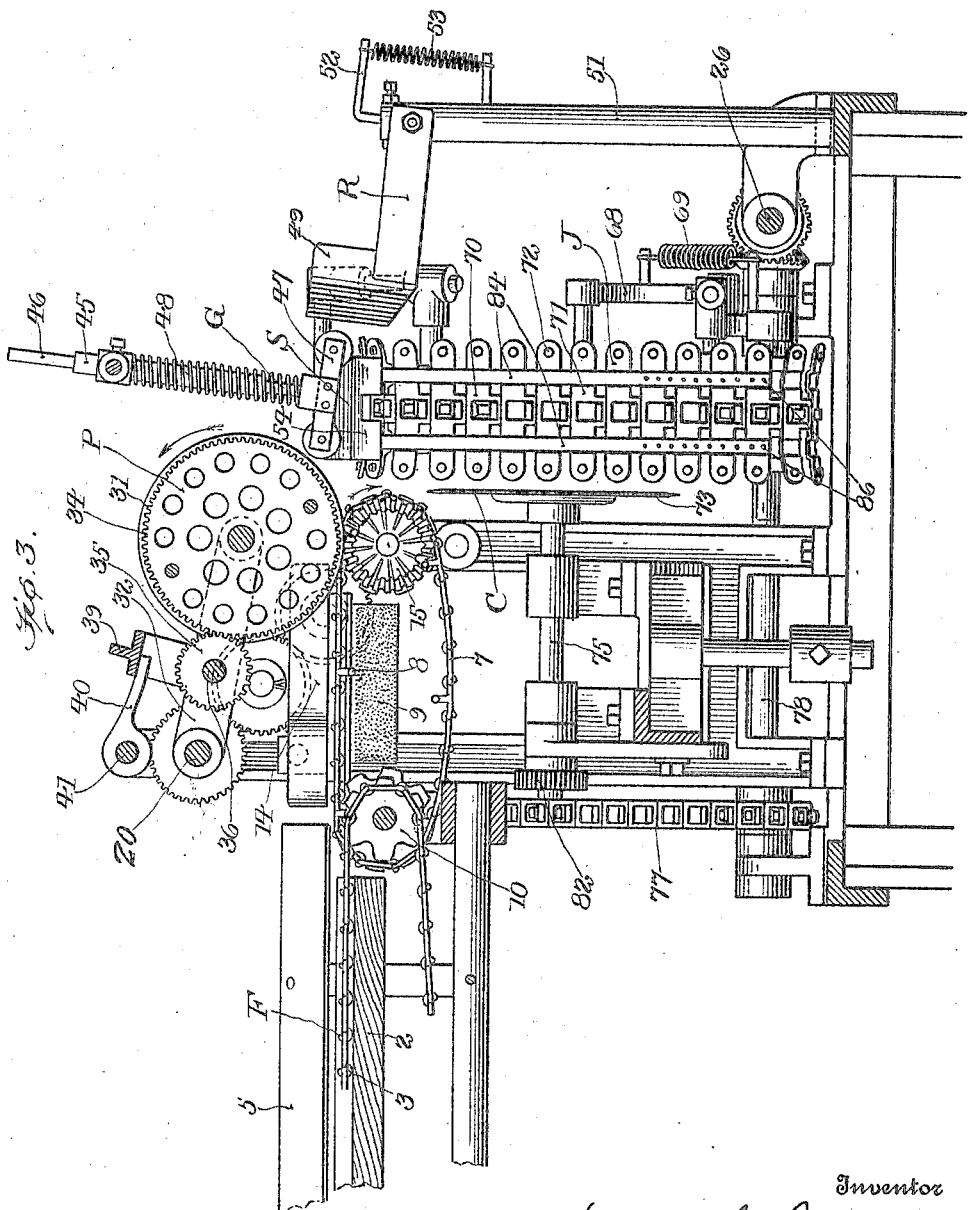
Figure 3 is a vertical sectional view taken longitudinally substantially centrally through the machine.
Figure 4:
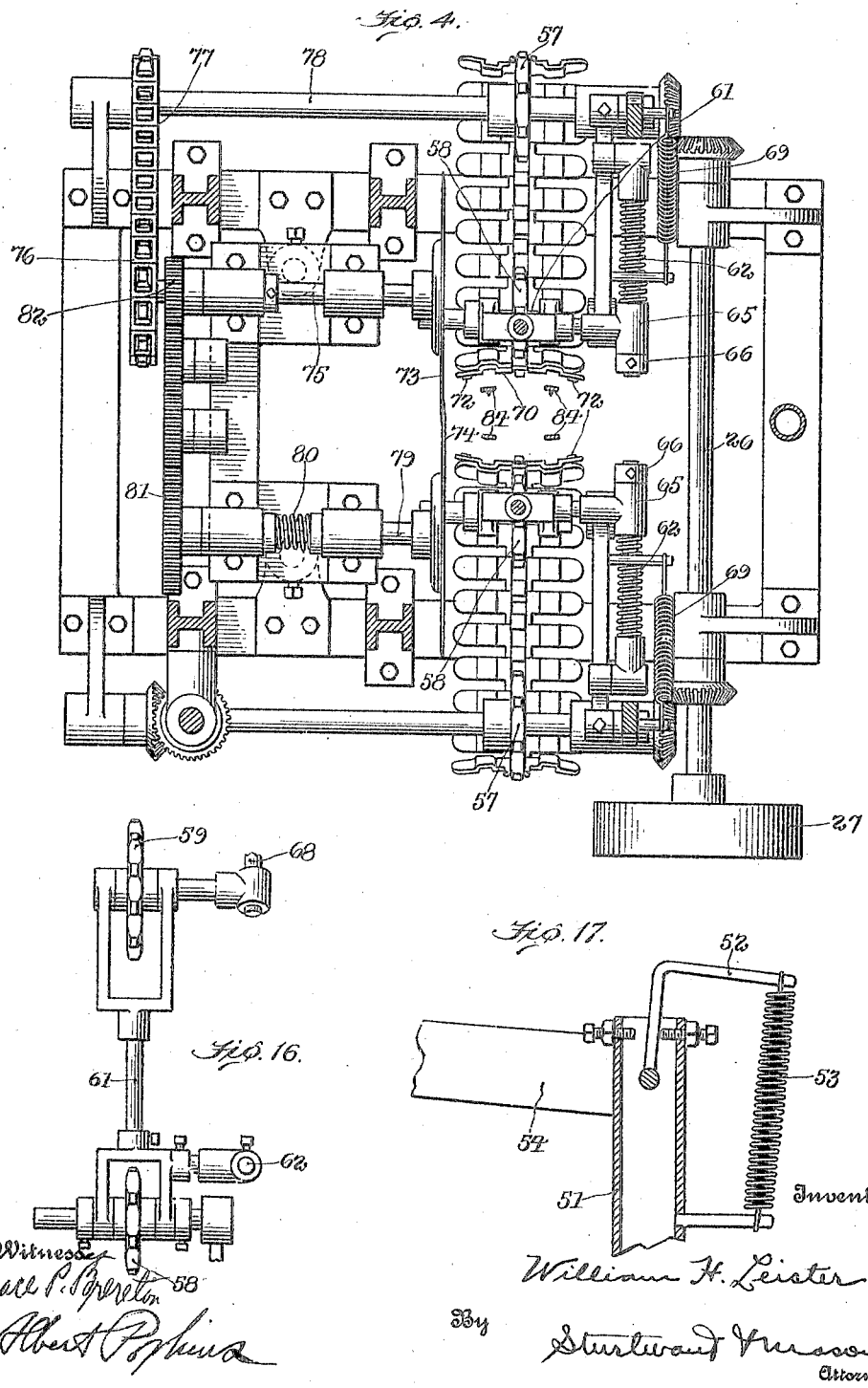
Figure 4 is a view partly in section and partly in plan, showing the severing means and the devices for feeding the ears of corn to and away from said severing means.

Co-operating with the alining devices 15 and 16 is a pressure mechanism P, which includes in the present embodiment of the invention a pressure disc 31. This pressure disc is journaled in a yoke 32 mounted to swing freely on a rod 33 carried by the supporting frame. The pressure disk 31 consists in part of two disks with an intermediate gear 34 which meshes with a gear 35 on a shaft 36, and this shaft 36 carries a second gear 37 which meshes with a gear 38 on the shaft 20. Through this gearing the pressure disk 31 is positively rotated in a counter-clockwise direction, as viewed in Figure 3, while the alining devices 15 and 16 are rotated in a clockwise direction, as indicated in this figure.

The yoke 32, as shown in the drawings, carries a bracket 39, and a finger 40 loosely mounted on a rod 41 extends underneath this bracket. A spring 42 encircling the rod 41 engages the finger 40 at one end, while the other end is secured to a fixed collar 43 on the rod. This spring normally tends to raise the outer end of the finger 40, which also normally tends to lift the pressure disk, and thus take a portion of its weight off from the ear of corn. By adjusting the tension of the spring, the pressure of the disk against the ear of corn may be varied. As clearly shown in Figure 10, this pressure disk is located centrally over the alining devices 15 and 16, and the disk is shaped to conform to a certain extent with the curved surface of the ear.

The ear of corn is presented by the conveying chains point first between the alining devices and the pressure disk. The pressure disk yields, allowing the ear to pass between said disk and the alining devices. The forward movement of the projecting fingers carries the ear forward, said disk and alining devices in effect traveling along the ear from the point of the ear toward the butt thereof. The pressure of the disk is not sufficient to injure in any way the kernels of the corn, but as soon as the grain shoulder of the ear passes over the high point of the alining devices, said pressure disk will cause the ear to follow along the alining devices in a horizontal position and aid in driving the ear into the retarding device to be described, the ribs on the alining devices digging into the soft husks adjacent the grain shoulder draws the butt downwardly and through the aid of the retarding device the alinings devices crush the husks and find the grain shoulder which is held close against the cone surfaces of the alining devices and the ears are thus alined by their grain shoulders for the cutting mechanism.

Tip supporting and ear retarding member.

Located in the line of the initial feed of the ear between the pressure disk and the alining devices, is the retarding member R, consisting of two yielding jaws 49 fixed to a rod 50 pivoted in the upper end of a standard 51. Said rod is also provided with an arm 52 to which a spring 53 is attached, and this spring through the rod 52, normally holds the yielding jaws 49 in raised position. The jaws at their receiving ends are tapered to receive the tip of the ear, and these jaws are so positioned that the tip of the smallest ear will engage the jaws just before the grain shoulder of the ear reaches the alining devices. Ears of all lengths will separate the jaws and pass more or less into the jaws.

These jaws form a retarding member which cooperates with the alining devices in the crushing of the husks and the finding of the grain shoulder of the ear and then in the retaining of the grain shoulder of the ear against the alining devices. It will be understood, of course, that as soon as the grain shoulder of the ear passes over the extreme horizontal point of the alining devices, it is positioned for serving so far as endwise movements are concerned. In reaching this point the ear has moved forward and downward, and the retarding member separates to permit this forward movement of the ear and moves downward with the ear, thus maintaining it in horizontal position while it is being positioned by the alining devices. The pivotal support for the retarding device is below the point where the ear makes contact therewith and the forcing of the ear endwise between the retarding devices will therefore hold the same raised. These devices will however, move downwardly with the ear when it starts on its downward movement. As soon as the ear passes out of the retarding member after a further downward movement thereof, the spring 53 returns the retarding member to normally raised position for the next ear.

The tip-supporting and ear-retarding member also operates to perform another very important function. Each ear has more or less of a sliding endwise movement in this retarding member, which results in holding the husk back while the ear creeps forward. This creeping of the ears in the husks greatly facilitates loosening of the husks from the ears. The pressure of the disk 31 against the ear not only helps to keep the ear in horizontal position, but helps to loosen and separate the husks by pressing down on the same off-center while the body of the ear is passing underneath the same. In other words, the disk as above noted, is in reality formed of two disks which are spaced by an intermediate gear, and these two disks engage the ear with considerable pressure at opposite sides of a vertical plane passing through the longitudinal axis of the ear.

Yielding supporting plates.

As the ear passes between the alining devices and the pressure disk, it passes over the yielding bridge or supporting plates. These bridge plates are positioned normally just above the lugs on the jaw bands, and each consists of a flat metal plate 54 carried by an arm 55 mounted on the frame supporting the jaw bands. These bridge plates hold the ear from any possible engagement by the jaw bands until the ear has been substantially placed in alined position, then the downward movement of the ear depresses these bridge plates and brings the same into position to be gripped by the jaw bands. The bridge plates open with the jaw bands to permit the ear to pass.

Ear controlling device.

Projecting from the yoke 32 is an arm 44. A sleeve 45 is fixed to the outer end of this arm and movably mounted in said sleeve is a rod 46 which carries a shoe 47 at its lower end adapted to engage the ear of corn for assisting in holding the same in substantially horizontal position and for starting the ear of corn between the jaw bands. Surrounding the sleeve 45 is a spring 48 which yieldingly forces the sleeve downward. This controlling device is carried by the support for the pressure disk and does not come into action until the pressure disk has reached a predetermined point in its downward movement. When the ear moves downwardly, the controlling device comes into engagement therewith and forcing the tip down with the butt maintains the ear in horizontal position. After the ear has been fully alined and is resting on the bridge plates, then a further downward movement of shoe 47 forces the bridge plates down through the medium of the ear, so that the lugs on the jaw bands engage the ear and feed the same to the severing mechanism.

Jaw bands.

As a means for conveying the ears after they are positioned in line with the severing mechanism, indicated at C, I have provided jaw bands. These jaw bands are alike in construction and the description of one will answer for the other. Each jaw band consists of an endless traveling chain 56, which passes over sprocket wheels 57, 58 and 59. The sprocket wheels 57 and 58 are suitably journaled on the frame of the machine while the sprocket wheel 59 is carried by a swinging frame 61. This swinging frame is pivoted at 60. The swinging frame is normally moved toward the center of the machine by a spring 62 which encircles a rod 63 pivoted at 64. A collar 65 carried by the frame 61 moves on this rod, and the inward movement of the frame is limited by a stop collar 66 secured to the rod 63.

From the above it will be apparent that the upper ends of the jaws are capable of yielding bodily so as to be moved away from the center of the machine. An idler sprocket 67 carried by an arm 68 is caused by a spring 69 to take up the slack in the endless chain, or give up slack thereto, as the swinging frame moves out and in.

Each of these chains is in the form of a link 70 (see Figure 9) and each link has horizontally projecting arms 71 which are curved so as to conform in a general way to the natural curve of a normal ear of corn, as clearly shown in Figure 8. Each arm has a projecting stud 72 which is adapted to become embedded in the husks and thus firmly grip the ear. These studs, however, do not in any way injure the kernels of the ear. These links, with the projecting arm and the studs, form the jaw bands.

As noted above, the ear as it is being alined rests on the supporting plates 54. A downward movement of the ear through the action of the starter 47 presses the plates 54 downwardly, and this permits the jaw bands to grip the ear. The gripping of the ear, however, does not take place until the grain shoulder of the ear has reached its alined position, that is, until the grain shoulder is pressed firmly against the alining devices 15 and 16 at a point substantially ninety degrees from the high point of said alining devices. In this position, the ear will pass the alining devices without further endwise movement, and the cutting devices are set relative to these alining devices so as to cut the stalk or stem close to the grain shoulder, and as a matter of fact shaving the end of the cob close to the extreme kernels on the ear.

The ear controlling device or pressure shoe, together with the retarding member, cooperates with the pressure disk in maintaining the ear in horizontal position until it is gripped by the jaw bands, and then it will be carried forward, maintained in this level or horizontal position as it is presented to the cutting devices which results in the cutting of the butt in a plane at right angles to the longitudinal center line of the ear. The swinging frames 61 move outward to allow the ear to pass between the jaw bands. As soon as an ear of corn has passed the sprocket wheels 59, the jaw bands may yield in sections, the idler 67 giving up slack for this purpose. Thus it will be seen that one ear of corn may be gripped by the jaw bands at a point adjacent the upper end thereof, while another may be firmly gripped at a point farther down, and still a third, if desired, may be gripped still farther down, and at the same time all three ears of corn may vary in size.

Cutting means.

The cutting means or severing device, indicated at C in the present embodiment of the invention consists of two rotating cutting disks, indicated at 73 and 74, respectively. The cutting disk 73 is fixed to a shaft 75 mounted in suitable bearings, and this shaft is driven by a sprocket wheel 76 through a sprocket chain 77 which meshes with a sprocket wheel on a shaft 78 connected through suitable beveled gears with the main shaft 26. This shaft 78 also operates the jaw band at the right of the machine, as viewed in Figure 2.

The cutting disk 74 is carried by a shaft 79, which is journaled in suitable bearings and which is movable endwise in its bearings by a spring 80. The shaft 75 is held from endwise movement, and this yielding movement of the shaft 79 causes the disk 74 to be pressed yieldingly against the cutting disk 73. The shaft 79 is provided with a gear 81 which meshes through a train of gears with a gear 82 on the shaft 75. These gears are so proportioned that the cutting disk 73 rotates at a greater speed than the cutting disk 74. This difference in the surface speeds of the cutting disks greatly facilitates the cutting of the butt of the ear. The jaw bands, which feed the ear to the cutting devices, are timed so as to feed said ear slightly slower than the surface speed of the fast cutting disk and slightly faster than the surface speed of the slow traveling cutting disk. Therefore, both cutting disks will have a drawing cutting action on the stem or stalk and butt which makes a clean quick cut. They also aid in conveying the ear, and in fact would support and convey the ear without the aid of jaw bands.

Figure 2:
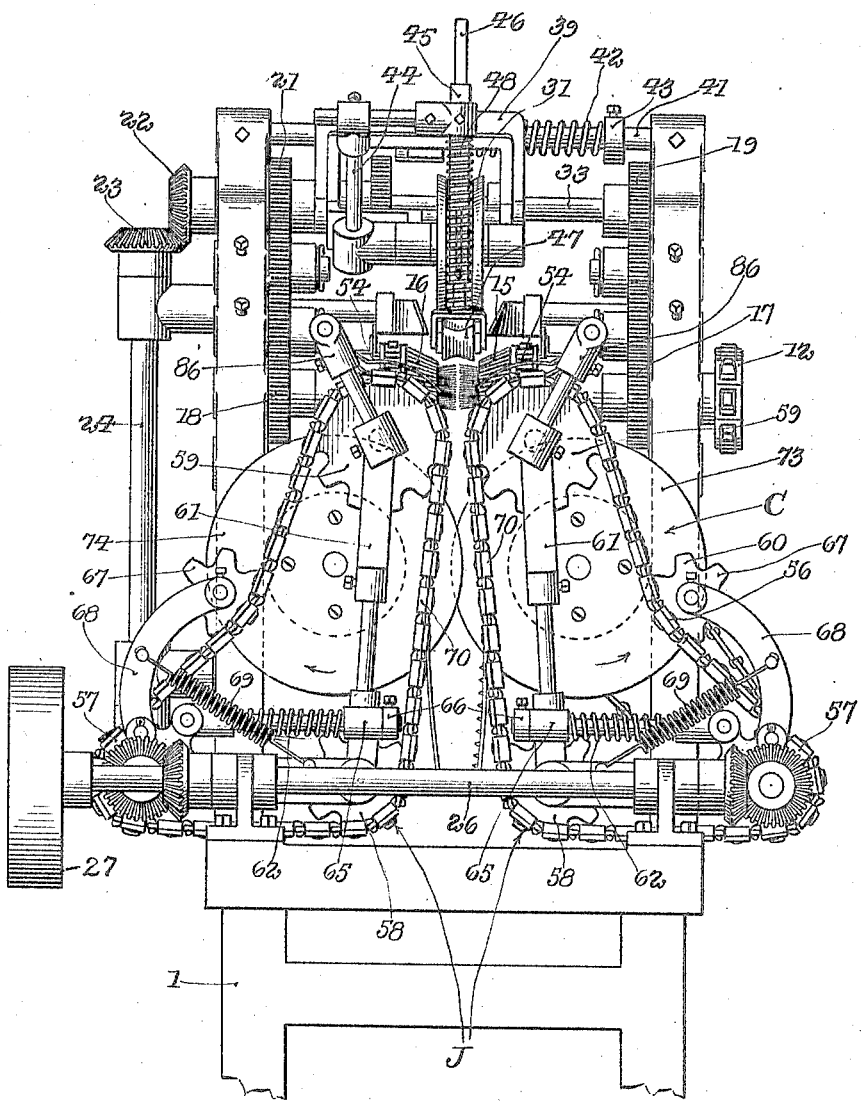
Figure 2 is a front view of the same.
Figure 5:
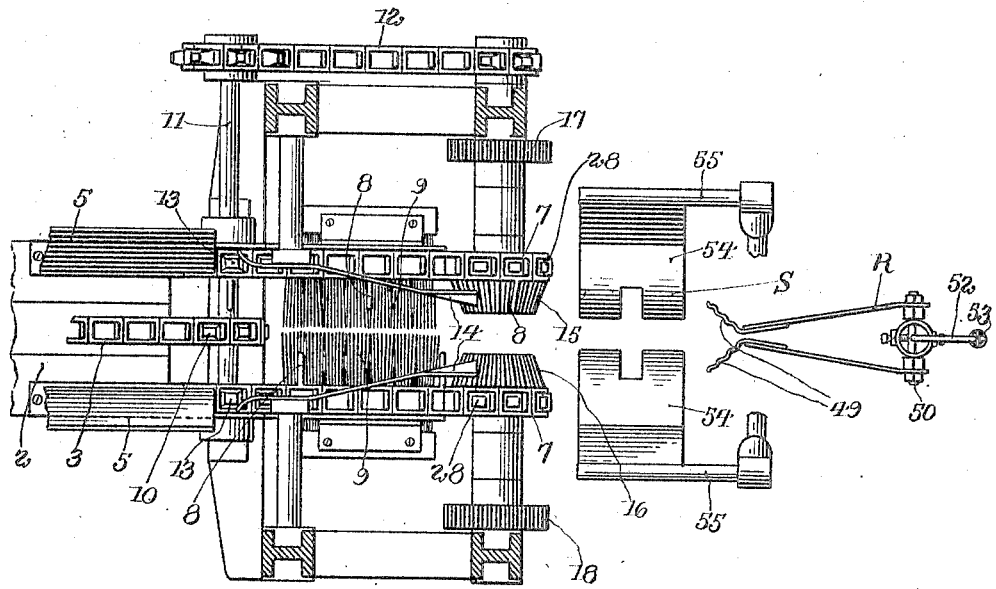
Figure 5 is a view, partly in section and partly in plan, showing more or less diagrammatically the alining devices, a portion of the means for feeding the ears over the alining devices, the retarding devices for holding the ear against the alining devices, and the temporary supporting devices for the ear.
Figure 6:
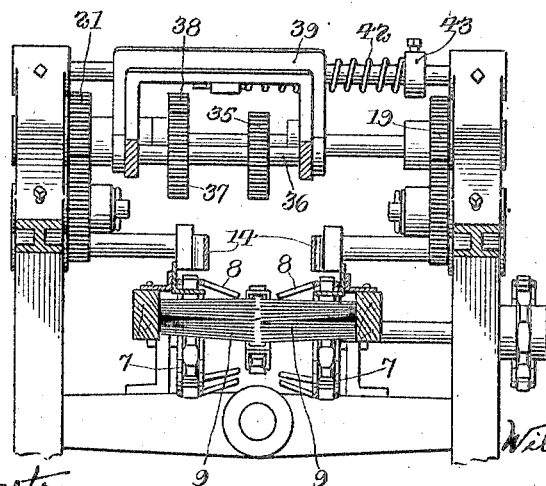
Figure 6 is a sectional view on the line 6—6 of Figure 1.

As clearly shown in Figures 7 to 9, inclusive, the projecting arm 71 of the jaw bands are each provided with an off-set section 83. Fixed to the supporting arms 55 carrying the bridge plates are bars 84. These bars extend along down the jaw bands lying in the recesses formed by these off-set portions 83. The bar 84 at the right, as viewed in Figure 2, is smooth, while the bar 84 at the left, as viewed in this figure, is formed with teeth 85. These bars at the lower end project out away from the traveling jaw bands, and as the ear of corn with its butt severed therefrom passes between the bars, the teeth will operate to loosen and separate the husks which greatly facilitates the husking action of the husking means. The arms 55 are carried by the swinging frame 61, said arms being mounted in arms 86, (see Figures 2 and 5) adjustably fixed to the upper end of the swinging frame so that these supporting plates and the rods 84 move back and forth with the swinging jaw bands.

Operation.

The operation of my machine will be apparent from the above detailed description.

The operator places the ears of corn, one after the other, on the feeding-in table, regardless of whether the tip of one ear overlaps or underlies the adjacent ear butt, and the conveyor belt, passing over the feeding-in table, moves the ears along the table, point first. The ears of corn are transferred to the traveling fingers, which move at a greater speed than the conveyor belt, and this separates one ear from the next following ear and presents the ear to the moving alining devices and pressure disk. The traveling fingers carry the ear over the top of the alining devices along the supporting plates and into the retarding device. At this time the pressure disk is rolling along over the surface of the ear proper, pressing against the same, the ear lying along and moving over the rotating alining devices. The retarding device engaging the ear hold the husks back causing the ear to crawl in the husks. It also holds the ear against the alining devices and causes the same to dig into the husks and crush the husks and stem if necessary so as to find the grain shoulder of the ear for alining the ear for cutting the butt. It also aids in holding the ear horizontal. As this grain shoulder passes the high point of the alining devices, the ear begins a sidewise or downward movement, as well as a continued forward movement, until it reaches the alining point, which is the point on the alining devices ninety degrees from the high point of the alining devices. At this point there is no further endwise movement of the ear, and the ear is alined ready for severing, the alining of the ear being brought about by the actual grain shoulder of the ear proper, as distinguished from any apparent shoulder formed by the husks. I am thus able to position the ear by the fixed grain shoulder, which determines the proper position for the severing of the butt of the ear.

It will be understood, of course, that by sidewise movement of the ear, I mean a movement of the ear in any direction at right angles to its longitudinal axis. In the present machine, this sidewise movement is in a vertical direction and downward.

After the ear has thus been positioned, a further sidewise and downward movement of the ear depresses the supporting plates and permits the ear to be caught by the jaw bands. The ear-starter or pressure shoe (and also alining means) causes this sidewise and downward movement of the ear, and also assists in maintaining the ear in horizontal or level position during such movement. As soon as the jaw bands have gripped the ear, it is carried positively forward and presented to the cutting devices, which quickly sever the stalk or stem from the ear at the proper point relative to the grain shoulder of the ear. Inasmuch as the ear is moved to the severing means in a path at right angles to its initial direction of travel as it passes over the alining devices, it will be quickly moved out of the way to allow the next ear to be alined. Two or more ears may be held by the traveling jaw bands, one of which is being received by the jaw bands; another of which is just leaving the cutting devices; while still another may be passing between the bars where the teeth of the bars operate to loosen and separate the husks.

In the drawings, I have shown in several of the figures an ear of corn which is indicated at E. Figure 20, a sectional view through the ear, clearly shows the grain shoulder E'. Figure 21 shows the point where the stalk or stem should be severed, in order to obtain the best results in husking and without wasting the corn. It will be apparent from the above description, that I am able to position the ear with certainty relative to the cutting means, so that the stem or stalk and the clinging husks will be cut close to the grain shoulder, without wasting the corn.

It will also be apparent from the above, that I have provided a machine which may be fed very rapidly and in which the butts of the ears may be quickly severed, and, therefore, the capacity of the machine is very great, as compared with debutting machines of the type at present in use. While my machine is especially adapted for the severing of a stalk or stem from the ear before it is husked, it will be apparent that from certain aspects of the invention this machine may be used for severing the stalk or stem from ears after they have been husked. It will also be apparent that while I have described and shown in detail an arrangement of the machine wherein the ears pass over the alining devices, said machine may be positioned so as to cause the ears in the same manner to pass along the alining devices, or possibly underneath the same, and this reference to the ears as passing over the alining devices is purely for the purpose of description and not limitation.

From the above description it will be noted that my improved machine is divided by a central vertical plane at right angles to the plane of the cutting device. The feed chains are located one on each side of this central plane, likewise the alining devices, the members of the retarding device the bridge plate and the jaw bands. The longitudinal axis of the ear moves in this central plane and the ears or parts thereof pass between the several devices.

It is also obvious that minor changes in the details of construction and the arrangement of parts may be made if desired, without departing from the spirit of this invention, as set forth in the appended claims.

Having thus described my invention, what I claim as new is:—

1. A corn debutting machine including cutting means, alining means engaging the body of the ear proper to find the grain shoulder for positioning the ear by the grain shoulder relative to the cutting means, and means for giving said ear of corn and alining means a relative movement to bring about the positioning of the ear on said alining means.

2. A corn debutting machine including cutting means, alining means operating upon the grain shoulder of the ear for positioning the ear for debutting, and means for moving the ear endwise for causing the grain shoulder to approach the alining means from the body of the ear to engage said alining means.

3. A corn debutting machine including cutting means, alining means operating upon the grain shoulder of the ear for positioning the ear for debutting, and means for moving the ear endwise and point first along the alining means and into engagement therewith.

4. A corn debutting machine including in combination, cutting means, alining means for positioning the ears relative to the cutting means, and devices cooperating with the alining means for causing said alining means to operate upon the body of the ear proper to find and position the ear by the grain shoulder of the ear.

5. A corn debutting machine including in combination, cutting means, alining means for positioning ears relative to the cutting means, means for moving the ear endwise and point first over said alining means, and devices cooperating with the alining means for causing said alining means to find and position the ear by the grain shoulder of the ear.

6. A corn debutting machine including in combination, cutting means, alining means for positioning the ears relative to the cutting means, means for moving the ears endwise and point first over the alining means, and means for moving the ear sidewise for causing the alining means to find and position the ear by the grain shoulder of said ear.

7. A corn debutting machine including in combination, cutting means, alining means for positioning the ears relative to the cutting means, means for moving the ears endwise and point first over the alining means, means for retarding the endwise movement of the ears, and means for moving the ears sidewise while against the alining means whereby said alining means is caused to find and position the ears by the grain shoulders of the ears.

8. A corn debutting machine including cutting means, alining means engaging the body of the ear proper to find the grain shoulder for positioning the ear by the grain shoulder relative to the cutting means, and means for giving the ear and alining means a relative movement along the body of the ear for causing the alining means to engage the grain shoulder.

9. A corn debutting machine including cutting means, spaced co-acting alining means revolving in the same direction and about a common axis for engaging the grain shoulder of the ear for positioning the ear for debutting.

10. A corn debutting machine including cutting means, alining means operating on the grain shoulder of the ear for positioning the ear for debutting, means for moving the ear endwise for causing the grain shoulder to approach the alining means from the body of the ear, and means for holding the ear against said alining means for aiding the alining means in finding the grain shoulder.

11. A corn debutting machine including cutting means, alining means operating on the grain shoulder of the ear for positioning the ear for debutting, and retarding means for causing the grain shoulder of the ear to engage said alining means, said retarding means including yielding devices.

12. A corn debutting machine including cutting means, cooperating alining devices rotating in the same direction and operating upon the body and grain shoulder of the ear for positioning the ear, and pressure means revolving in the opposite direction to that of the alining devices at the point of engagement with the ear and operating to assist in the moving of the ear over the alining devices.

13. A corn debutting machine including cutting means, a spaced rotating alining device and a rotating pressure disk cooperating with the rotating alining device to cause the ear to move endwise over the alining device.

14. A corn debutting machine including in combination, cutting means, spaced rotating alining devices, means for moving the ears one after the other point first over the alining devices, and means cooperating with the alining devices for causing said alining devices to find and position the ears by the grain shoulders of the ears.

15. A corn debutting machine including in combination, cutting means, spaced alining devices rotating in the same direction for positioning the ears relative to the cutting means, and means for forcing the ears against the alining devices whereby said alining devices crush the husks at the butt of the ear to find the grain shoulder and position the ear by the grain shoulder thereof.

16. A corn debutting machine including in combination, cutting means, spaced rotating alining devices for positioning the ears relative to the cutting means, feeding means for feeding the ears one after the other point first over the alining devices, means for retarding the forward movement of the ear as the butt thereof reaches the alining devices, and means for holding the ear against the alining devices.

17. A corn debutting machine including cutting means, spaced coacting alining means, means for positively rotating said alining means about a common axis, said alining means operating to engage the body of the ear to approach and find the grain shoulder and operating to position the ear by the grain shoulder for cutting.

18. A corn debutting machine including cutting means, spaced rotating alining devices and a rotating pressure disk, said pressure disk being yieldingly mounted so that the ear of corn may be fed between the pressure disk and the alining devices endwise and point first, said alining devices operating to crush the husk and find the grain shoulder of the ear for positioning the ear for debutting.

19. A corn debutting machine including cutting means, alining devices and means cooperating therewith whereby an ear is moved endwise over the alining devices and thence sidewise to cause the grain shoulder of the ear to engage the alining devices for positioning the ear.

20. A corn debutting machine including cutting means, spaced rotating alining devices, a yieldingly mounted rotating pressure disk, said disk yielding to permit the ear of corn to pass between the disk and the alining devices whereby said ear may be moved endwise and point first over the alining devices and thence sidewise to cause the grain shoulder of the ear to engage the alining devices for positioning the ear for debutting.

21. A corn debutting machine including cutting means, alining devices and means cooperating therewith whereby the ear of corn is moved endwise and tip first and thence sidewise into its final alined position.

22. A corn debutting machine including cutting means, alining devices, means cooperating with said alining devices for causing the ear of corn to move endwise tip first and sidewise to alined position on the alining means.

23. A corn debutting machine including in combination, cutting means, alining devices for positioning the ears relative to the cutting means, means for feeding the ears point first over the alining devices, means for retarding the forward movement of the ears as the butts of the ears reach the alining devices, means for forcing the ears sidewise for causing the alining devices to find and position the ears by the grain shoulders thereof, and independent means for positively feeding the positioned ear to the cutting means.

24. A corn debutting machine including in combination, cutting means, alining devices for positioning the ears relative to the cutting means, means for feeding the ears point first over the alining devices, means for retarding the forward movement of the ears as the butts of the ears reach the alining devices, means for forcing the ears sidewise for causing the alining devices to find and position the ears by the grain shoulder thereof, spaced jaw bands for positively gripping the positioned ears and presenting the same to the cutting means, and carrying same away from the cutting means.

25. A corn debutting machine including in combination, cutting means, alining devices for positioning the ears relative to the cutting means, means for feeding the ears point first over the alining devices, means for retarding the forward movement of the ears as the butts of the ears reach the alining devices, means for forcing the ears sidewise for causing the alining devices to find and position the ears by the grain shoulder thereof, spaced jaw bands for positively gripping the positioned ears and presenting the same to the cutting means, said jaw bands being supported so as to yield in sections to permit two or more ears to be gripped and carried thereby at the same time.

26. A corn debutting machine including in combination, cutting means, alining devices for positioning the ears relative to the cutting means, means for feeding the ears one after the other endwise and point first over the alining devices, means cooperating with the alining devices for causing the alining devices to position the ear by the grain shoulder of the ear, and means for receiving the positioned ears and feeding the same sidewise to the cutting means.

27. A corn debutting machine including in combination, cutting means and means for conveying the ears thereto including two separate feeding mechanisms, one of which delivers the ears to the other, the last feeding means operating upon the ears moving at a greater speed than the first moving means whereby the ears are spaced.

28. A corn debutting machine including in combination, cutting means, and endless conveyor for moving the ears endwise, a pair of endless conveyors for receiving the ear and moving the same toward the cutting mechanism, said pair of endless conveyors traveling at a greater speed than the first conveyor for spacing the ears.

29. A corn debutting machine including in combination, cutting means, a supporting table, an endless conveyor for moving the ears endwise along said table, a pair of conveyors having staggered projecting fingers for receiving the ears and moving the same toward the cutting mechanism.

30. A corn debutting machine including in combination, cutting means, alining devices, a supporting table, an endless conveyor for moving the ears endwise along said supporting table, endless chains having projecting fingers for receiving and moving the ears to the alining devices.

31. A corn debutting machine including in combination, cutting means, alining devices, a supporting table, an endless conveyor for moving the ears endwise along said supporting table, endless chains having projecting fingers for receiving and moving the ears to the alining devices, the surfaces of said alining devices moving in the same direction as said chains and having recesses to receive the fingers whereby said fingers may become a part of the alining means.

32. A corn debutting machine including in combination, cutting means, alining means, a supporting table, an endless conveyor for moving the ears endwise along said supporting table, spaced endless chains having projecting fingers for receiving the ears and presenting the same to the alining devices said table having a yielding section adjacent the alining devices which yields to permit the stalk or stem to pass whereby the ears of corn may be moved sidewise to final alined position and for presenting the same to the cutting means.

33. A corn debutting machine including in combination, cutting means, alining devices for positioning the ears relative to the cutting means, feeding mechanism for feeding the ears one after the other endwise to the alining devices, said feeding mechanism including two feed devices, one of which delivers the ears to the other, the last named feed device being operated at a greater speed than the first feed device whereby the ears received promiscuously as to the endwise spacing by the first feed device will be spaced by the second feed device.

34. A corn debutting machine including in combination, cutting means, alining devices for positioning the ears relative to the cutting means, and endless conveyor for receiving the ears and moving the same endwise toward the alining devices, endless feeding devices for receiving the ears from the conveyor and for feeding the same to the alining devices, said endless feeding devices being operated at a greater speed than the endless conveyor so as to space the ears received therefrom as they are delivered to the alining devices.

35. A corn debutting machine including in combination, cutting means, spaced rotating alining devices, a feeding-in table along which the ears of corn are fed point first over the alining devices, and means cooperating with said alining devices for moving the ear sidewise for placing the grain shoulder in engagement with the alining devices whereby the ear is positioned by the grain shoulder for cutting, the stalk or stem of the ear being adapted to pass between the alining devices and also between the feed means.

36. A corn debutting machine including in combination, cutting means, spaced rotating alining devices, a feeding-in table along which the ears of corn are fed point first over the alining devices, and means cooperating with said alining devices for moving the ear sidewise for placing the grain shoulder in engagement with the alining devices whereby the ear is positioned by the grain shoulder for cutting, the stalk or stem of the ear being adapted to pass between the alining devices, said feeding-in table having yielding means adjacent the alining devices so as to permit the extending stalks to pass through the feeding-in table.

37. A corn debutting machine including in combination, cutting means, rotating spaced alining devices having sprocket teeth and inclined alining faces projecting toward each other, said inclined faces having recesses formed therein, feed chains for delivering the ears of corn endwise and point first to the alining devices, said feed chains operating respectively on said sprocket teeth, said chains having fingers projecting horizontally therefrom for separating and feeding the ears of corn, and said fingers being spaced so as to engage said recesses in the alining devices.

38. A corn debutting machine including in combination, positively rotating cutting devices, means for positioning the ear of corn relative to the cutting devices so that said ear will be debutted at the grain shoulder, and means for positively feeding the positioned ear to said cutting devices.

39. A grain debutting machine including in combination, coacting cutting discs, means for rotating said coacting cutting discs in opposite directions, means for positioning the ear relative to the cutting discs, whereby the ear will be debutted at the grain shoulder, and means for positively feeding the positioned ear to the cutting discs.

40. A corn debutting machine including cutting discs, means for positively rotating said discs, said means including devices for rotating one disc at a greater speed than the other, means for positioning the ear of corn whereby it will be debutted at the grain shoulder, and means for positively feeding the positioned ear to the cutting discs.

41. A corn debutting machine including in combination, positively rotating cutting disks, one of which is operated at a greater speed than the other, and means for positioning the ears relative to the cutting disks and positively feeding the same to said cutting disks.

42. A corn debutting machine including in combination, positively rotating cutting disks, one of which is held from sidewise movement, and means for yieldingly pressing the other disk against the first named disk, one of said disks being operated at a greater speed than the other, and means for positively feeding the ears of corn to the cutting disks.

43. A corn debutting machine including in combination, cutting means, spaced yielding movable devices for engaging the ears substantially at opposite sides thereof and for presenting the same to the cutting means.

44. A corn debutting machine including in combination, cutting devices, yieldingly mounted rollers traveling in opposite directions and conveyor belts moving over said rollers for engaging the ears of corn and presenting the same to the cutting devices.

45. A corn debutting machine including in combination, cutting means, flexible jaw bands for gripping the ear on opposite sides thereof, and moving the ears sidewise to the cutting means.

46. A corn debutting machine including in combination, cutting means, flexible jaw bands for gripping and feeding the ears to the cutting means, said jaw bands being constructed so as to yield bodily to permit the ear of corn to pass between the same.

47. A corn debutting machine including in combination, cutting devices, yieldingly mounted rollers traveling in opposite directions and conveyor belts moving over said rollers for engaging the ears of corn and presenting the same to the cutting devices, said jaw bands being constructed so as to yield in section to accommodate the different sized ears and whereby two or more ears may be gripped at the same time.

48. A corn debutting machine including in combination, cutting devices, yieldingly mounted rollers traveling in opposite directions and conveyor belts moving over said rollers for engaging the ears of corn and presenting the same to the cutting devices, said jaw bands having curved projecting arms disposed so as to grip the ears at opposite sides thereof for presenting the same to the cutting means.

49. A corn debutting machine including in combination, movable cutting devices for cutting and conveying the ear while it is being cut, jaw bands for gripping the ears and presenting the same to the cutting devices, said jaw bands moving at the same speed as the ear is conveyed by the cutting devices.

50. A corn debutting machine including in combination, cutting means, and jaw bands for gripping and feeding the ears to the cutting means, said jaw bands including yielding supporting means whereby the jaw bands may be caused to engage and grip ears of different sizes.

51. A corn debutting machine including in combination, cutting means, and jaw bands for gripping and feeding the ears to the cutting means, said jaw bands including yielding supporting means whereby the jaw bands may be caused to engage and grip ears of different sizes, a yielding idler for each jaw band for permitting the shifting of the same and for permitting the jaw bands to yield in section so the two or more ears of different sizes may be simultaneously gripped and fed thereby.

52. A corn debutting machine including in combination, cutting devices and jaw bands for gripping and feeding the ears to the cutting devices, said jaw bands each including connected links, arms formed integral with the links and projecting horizontally therefrom, said arms being curved to conform to the lengthwise shaping of the ears, and projecting studs or cleats formed on the outer faces of the arms for engaging and gripping the husks of the ears.

53. A corn debutting machine including in combination, cutting devices, means for clamping and positively feeding the ears to the cutting devices, bars located in the path of movement of the ears after leaving the cutting devices, certain of said bars having teeth formed thereon for engaging and loosening the husks of the ears after they have been debutted.

54. A corn debutting machine including in combination, jaw bands for conveying the ears and means for causing the ear to break contact with one jaw band and for holding the ear against the other jaw band whereby the husk is loosened from the ear.

55. A corn debutting machine including in combination, cutting devices, opposed jaw bands for gripping the ears and presenting the same to the cutting devices, a bar disposed relative to one of the jaw bands to cause the ear to break therefrom after passing the cutting device and a bar adjacent the other jaw band having projections for engaging the husks to assist in loosening the husks from the ear and each other.

56. A corn debutting machine including in combination, cutting devices, feeding means for presenting the ears to the cutting devices, bridge plates located above said feeding means, means for placing the ears on the bridge plates and for positioning the same relative to the cutting devices, and means whereby the ear is caused to depress the bridge plates to cause the ear to be engaged by said feeding means beneath the same.

57. A corn debutting machine including in combination, cutting devices, opposed traveling conveyors for gripping and feeding the ears to the cutting devices, bridge plates above said traveling conveyors, an alining device adjacent said bridge plates, and means for feeding the ear endwise over the alining devices and over said bridge plates, means for pressing the ears against the alining devices, and means for pressing the ears against the bridge plates for depressing the bridge plates and for causing the ears to be gripped by the conveying means.

58. A corn debutting machine including in combination, rotating cutting devices, yieldingly mounted opposed jaw bands for gripping the ears and presenting the same to the cutting devices, yielding bridge plates disposed above the jaw bands, an alining means adjacent the bridge plates, means for feeding the ears endwise over the alining means and the bridge plates, a retarding device for forcing the ears into engagement with the alining means, and a controlling device for pressing the ear against the bridge plates for depressing the same and causing the ears to be gripped by the jaw bands.

59. A corn debutting machine including in combination, cutting means, an alining device for positioning the ear relative to the cutting means, means for feeding the ears endwise one after the other to the alining means, and thence sidewise to the cutting means, pressure means for holding the ear in contact with the alining means, means for engaging the point of the ear for holding the husks and causing the ear to creep in the husks, and means for engaging the ear for starting the same on its sidewise movement to the cutting means.

60. A corn debutting machine including in combination, cutting means, means for presenting the ears to the cutting means one after the other, and means for engaging the tips of the ears for holding the husks whereby the ears are caused to creep endwise in the husk.

61. A corn debutting machine including in combination, cutting means, an alining means, pressure devices including two spaced members for engaging the ear traveling along the same and at opposite sides of a vertical plane passing through the longitudinal axis of the ear, said pressure means operating to hold the ear in engagement with the alining means and also operating to loosen the husks.

62. A corn debutting machine including in combination, cutting means, rotating alining devices, means for moving the ear endwise and point first over the alining devices, retarding means for engaging the point of the ear, pressure means for engaging the ear and holding the same in contact with the alining devices, said retarding means being mounted so as to move with the ear in its sidewise movement to aid in positioning the grain shoulder of the ear against the alining device and for maintaining said ear in horizontal position.

63. A corn debutting machine including in combination, rotating alining devices, means for moving the ear endwise and point first over the alining device, retarding means for engaging the point of the ear, pressure means for engaging the ear and holding the same in contact with the alining devices, said retarding means being mounted so as to move with the ear in its sidewise movement to aid in positioning the grain shoulder of the ear against the alining device and for maintaining the ear in horizontal position, cutting devices, and means for gripping the ear after it is alined and for moving the same sidewise to the cutting devices.

64. A corn debutting machine including in combination, rotating alining devices, means for moving the ear endwise and point first over the alining device, retarding means for engaging the point of the ear, pressure means for engaging the ear and holding the same in contact with the alining devices, said retarding means being mounted so as to move with the ear in its horizontal position to aid in positioning the grain shoulder of the ear against the alining device and for maintaining the ear in horizontal position, cutting devices, bridge plates for supporting the ear while it is being alined, gripping devices for gripping the ear and presenting the same to the cutting devices, and a starting device operating through the ear to depress the bridge plates for bringing the ear into gripping relation with the gripping devices.

65. A corn debutting machine including in combination, cutting means, rotating alining devices, and a resisting device for engaging the ear for retarding the endwise movement of the ear said alining devices rotating in a direction toward the resisting device at the point of engagement with the ear.

66. A corn debutting machine including in combination, cutting means, rotating alining devices, a resisting device consisting of spaced yielding plates positioned so as to engage the ear at the tip end thereof for retarding the endwise movement of the ear, said alining devices rotating in a direction toward the resisting device at the point of initial engagement with the ear.

67. A corn debutting machine including in combination, cutting means, rotating alining devices, means for moving the ears of corn endwise and points first over the alining devices, a resisting device consisting of independent yielding plates positioned so as to engage the ear at the tip end thereof for retarding the endwise movement of the ear and means for causing the ear to move sidewise and forward while in the resisting device for crushing the husk to cause the grain shoulder of the ear to engage the alining devices for positioning the ear.

68. A corn debutting machine including in combination, cutting means, rotating alining devices, means for moving the ear of corn endwise and point first over the alining devices, a resisting device consisting of independent yielding plates positioned to engage the ear at the tip end thereof for retarding the endwise movement of the ear, means for causing the ear to move sidewise and forward while in the resisting device for crushing the husk to cause the grain shoulder of the ear to engage the alining devices for positioning the ear, and means for supporting said resisting device whereby the same moves with the ear in its sidewise movement to assist in maintaining the ear in horizontal position.

69. A corn debutting machine including in combination, cutting means, rotating alining devices, means cooperating with the alining devices for moving the ear endwise in a horizontal direction over the alining devices and thence vertically and horizontally to cause the grain shoulder of the ear to engage the alining devices whereby the ear is positioned by the grain shoulder, and means for moving the ear vertically to the cutting means without endwise movement.

70. A corn debutting machine including in combination, cutting means, an alining device for positioning the ear relative to the cutting means, traveling chains for feeding the ears to the alining means, said traveling chains having fingers projecting toward each other and downwardly for centering the ear between the chains as they are fed to the alining means.

71. A corn debutting machine including in combination, cutting means, alining devices and yieldingly gripping jaw bands for gripping the ears and presenting the same to the cutting means, yielding bridge plates disposed above the jaw bands, said bridge plates being supported so as to be movable bodily with the bodily movement of the jaw bands to permit entrance of the ears to the jaw bands.

72. A corn debutting machine including in combination, cutting means, yieldingly mounted opposed jaw bands for gripping the ears and presenting the same to the cutting means, and a starting device disposed centrally above the jaw bands for starting the ears between said jaw bands.

73. A corn debutting machine including in combination, cutting means, and spaced alining devices and means cooperating with said alining devices to cause the grain shoulder of the ear to engage said alining devices for positioning the ear, said alining devices being spaced a distance slightly less than the diameter of the grain shoulder of the smallest ear to be presented to the cutting means.

74. A corn debutting machine including in combination, cutting means, opposed rotating alining devices having their adjacent surfaces each shaped as the frustum of a cone, and means cooperating with the alining devices for causing the ear to move endwise and point first over the alining devices, and for causing the grain shoulder of the ear to follow the alining devices to an alining position, said alining devices being spaced a distance slightly less than the diameter of the grain shoulder of the smallest ear.

75. A corn debutting machine including in combination, cutting means, rotating alining devices, means cooperating with the alining devices for moving the ear endwise in a horizontal position over the alining devices, and thence sidewise and endwise to cause the grain shoulder of the ear to engage the alining devices whereby the ear is positioned by the grain shoulder, and means for moving the ear sidewise after it is alined to the cutting means without endwise movement.

76. A corn debutting machine including in combination, cutting means, alining devices, means cooperating with the alining devices for moving the ear endwise in a horizontal direction over the alining devices and thence in a horizontal and vertical direction in a horizontal position to cause the grain shoulder of the ear to engage the alining devices whereby the ear is positioned by the grain shoulder, and means for moving the ear vertically in a horizontal position after it is alined to the cutting means without endwise movement.

77. A corn debutting machine including in combination, cutting means, alining devices, means cooperating with the alining devices for moving the ear endwise in a horizontal direction over the alining devices, and thence in a horizontal and vertical direction in a horizontal position to cause the grain shoulder of the ear to engage the alining devices whereby the ear is positioned by the grain shoulder, and means for moving the ear in a sidewise position vertically downward after it is alined to the cutting means without further endwise movement.

78. A corn debutting machine including in combination, cutting means, alining devices, means cooperating with the alining devices for moving the ear endwise in a horizontal direction into contact with the alining devices, and thence in a horizontal and vertical direction in a horizontal position along said alining devices, whereby the ear is positioned by the grain shoulder, and means for moving the alined ear after it is alined in a sidewise position vertically downward to the cutting means without further endwise movement.

79. A corn debutting machine including in combination, cutting means, alining devices, means cooperating with the alining devices for moving the ear endwise in a horizontal direction into contact with the alining devices for the purpose of positioning the ear relative to the cutting means, and means for moving the ear after it is alined, in a sidewise position vertically downward to the cutting means without further endwise movement.

80. A corn debutting machine including cutting means, spaced co-acting alining devices, each device being shaped as the frustum of a cone, with the cones facing each other, and devices co-operating therewith whereby the shoulders formed by the cone faces and the adjacent parallel faces of the alining devices operate to crush the husks and position the ear by the grain shoulder thereof.

81. A corn debutting machine including cutting means, spaced co-acting alining devices, each device being shaped as the frustum of a cone, with the cones facing each other, and devices co-operating therewith whereby the shoulders formed by the cone faces and the adjacent parallel faces of the alining devices operate to crush the husks and position the ear by the grain shoulder thereof, said alining devices having corrugations in the cone surfaces thereof forming ribs for digging into the husks.

82. A corn debutting machine including in combination, cutting means, alining means for positioning the ears relative to the cutting means, and devices co-operating with the alining means for causing said alining means to find and position the ear by the grain shoulder of the ear, said alining means being corrugated to form ribs for digging into the husks.

83. A corn debutting machine including in combination, cutting means, alining devices, spaced endless chains having inwardly projecting fingers for feeding the ear to the alining devices.

In testimony whereof, I affix my signature, in the presence of two witnesses.

WILLIAM HAMMOND LEISTER.

Witnesses:
H. RALPH COVER,
WM. WEAGLY.